UNITED STATES PATENT OFFICE.

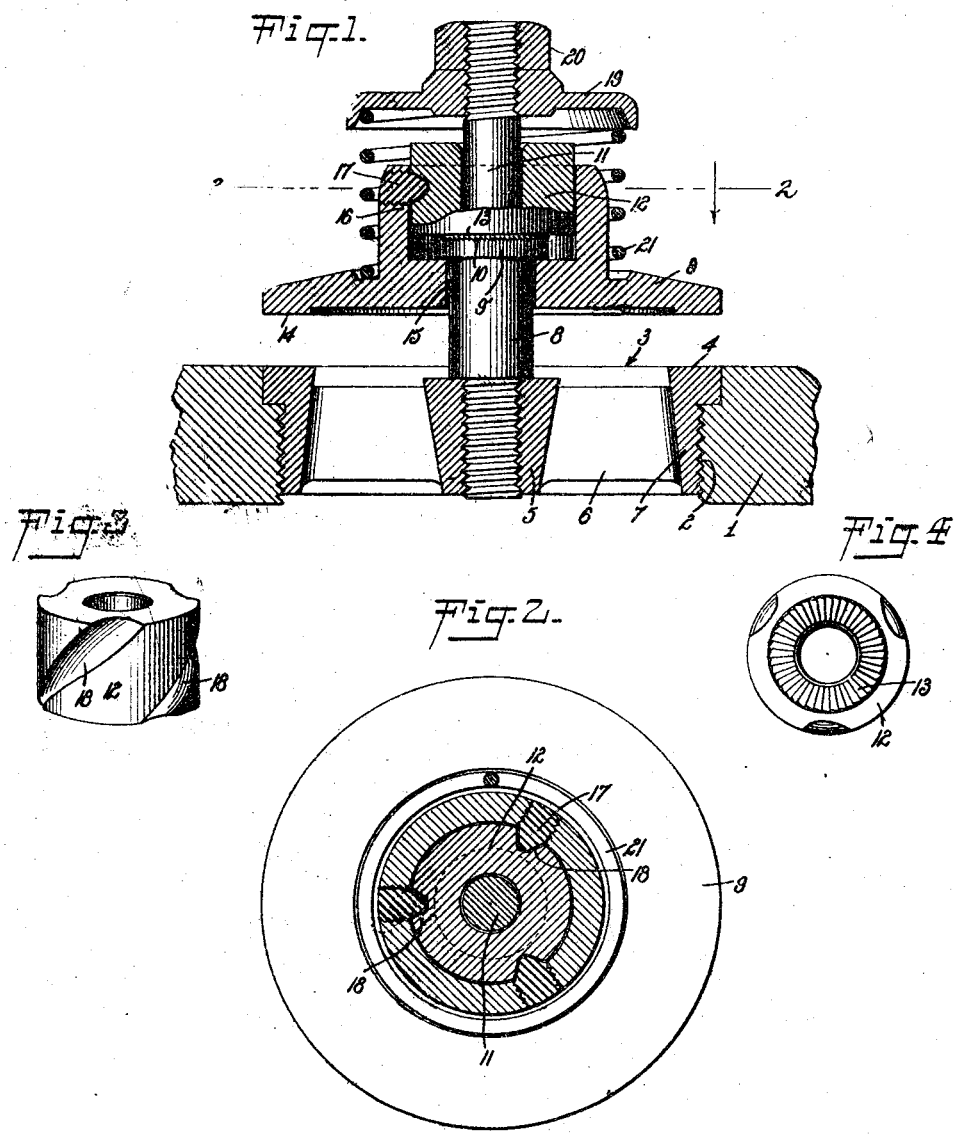

HENRY G. KLETT AND CHARLES N. VOIGHT, OF NEW YORK, N. Y.

SELF-GRINDING VALVE FOR PUMPS AND THE LIKE.

1,199,572.    Specification of Letters Patent.    Patented Sept. 26, 1916.

Application filed March 4, 1916. Serial No. 82,126.

*To all whom it may concern:*

Be it known that we, HENRY G. KLETT and CHARLES N. VOIGHT, subjects of the Emperor of Germany, and residents of the city of New York, borough of the Bronx in the county of the Bronx and State of New York, have invented a new and Improved Self-Grinding Valve for Pumps and the like, of which the following is a full, clear, and exact description.

This invention relates to puppet valves for engines, pumps and the like, and has to deal more particularly with a valve of that type in which there is a metal-to-metal contact between the valve body and the seat therefor.

The invention has for its general objects to improve and simplify the construction and operation of valves of the character referred to so as to be reliable and efficient in use, comparatively simple and inexpensive to manufacture, and so designed that the seating surfaces will always be maintained perfect.

A more specific object of the invention is the provision of a puppet valve in which the valve body as it moves open and closed has a slight rotary motion with respect to the seat to thereby keep the contacting surfaces of the valve body and seat perfectly smooth, whereby leakage is absolutely prevented.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a central vertical section of the valve showing the valve body in open position; Fig. 2 is a central section on the line 2—2, Fig. 1; Fig. 3 is a perspective view of the spirally grooved element which causes rotation of the valve body; and Fig. 4 is a bottom plan view of the element shown in Fig. 3.

Referring to the drawing, 1 designates the wall of a pump or engine cylinder which has a threaded opening 2 into which is screwed a valve seat 3 of any approved construction, the valve seat in the present instance being shown as a spider having a valve-engaging flat surface 4, an internally threaded hub 5 and spokes 6 connecting the hub with the circumferential portion 7. In the hub is screwed a stationary valve stem 8 on which the valve body 9 is mounted to move axially and rotatably. On the stem is a circumferential flange 9' having ratchet teeth 10. Surrounding the reduced portion 11 of the stem is a collar 12 free to move axially and rotatably. This collar has on its under side a circular series of ratchet teeth 13 which coöperate with the ratchet teeth 10, whereby the rotation of the collar, sleeve or ring 12 is limited to one direction. The valve body 9 has a flat seat-engaging surface 14 and a central opening 15 through which the valve stem passes. The side of the valve body opposite from the seat element 3 has a cylindrical flange 16 forming a chamber in which the sleeve 12 is disposed. Extending inwardly from the flange 16 are a plurality of projections or teeth 17 which engage in helical grooves 18 in the circumference of the sleeve 12. On the upper end of the stem is screwed a cupped washer 19 held in place by a jam-nut 20, and between this washer and the valve body is a stiff helical spring 21 surrounding the flange 16, the purpose of this spring being to seat the valve body 9 on the seat element 3.

In operation the valve body 9 moves open and closed with the strokes of the piston in the usual manner, except that during the reciprocation of the valve body 9 the latter receives a partial rotation, this taking place constantly while the valve is in operation, so that the points of contact between the valve body and the seat will be constantly changing, whereby grooves in the surfaces 4 and 14 will be prevented. The valve body in opening and closing is caused to rotate by reason of the projections or teeth 17 engaging in the spiral grooves 18, and by reason of the ratchet teeth 10 and 13 interlocking and permitting rotation of the collar 12 only in one direction.

From the foregoing description taken in connection with the accompanying drawing, the advantages of the construction and method of operation will be readily understood by those skilled in the art to which the invention appertains, and while we have described the principle of operation, together with the device which we now consider to be the best embodiment thereof, we desire to have it understood that the device shown is merely illustrative and that such changes may be made when desired as fall within the scope of the appended claims.

Having thus described our invention, we claim as new and desire to secure by Letters Patent:

1. The combination of a valve seat, a stem fastened to the seat, a flange on the stem and having ratchet teeth, a valve body movable on the stem between the seat and the flange of the stem, a collar mounted on the stem at a point beyond the flange from the seat, means between the collar and valve body for producing relative rotation of the two, ratchet teeth on the collar in engagement with the ratchet teeth of the flange to prevent rotation of the collar in one direction, and a spring acting on the valve body to seat the same.

2. The combination of a valve seat element, a stem fastened thereto, a valve body slidably and rotatably mounted on the stem, a spring bearing on the valve body to seat the same, a collar rotatably and slidably mounted on the stem, means between the valve body and collar in the form of helical grooves and teeth, whereby the reciprocation of the valve body causes rotation thereof, and ratchet means between the collar and valve stem for permitting the collar to turn only in one direction.

3. The combination of a valve seat element, a valve body having a central opening, a valve stem attached to the seat element and extending through the opening of the valve body, a flange on the stem for limiting the opening movement of the valve body, ratchet teeth on the flange, a collar surrounding the valve stem, ratchet teeth on the collar engageable with the first-mentioned ratchet teeth to permit the collar to rotate only in one direction, a washer on the outer end of the stem, a spring interposed between the washer and valve body for seating the latter, and means between the valve body and collar whereby the reciprocation of the valve body causes partial rotation thereof.

In testimony whereof we have signed our names to this specification in the presence of two subscribing witnesses.

HENRY G. KLETT.
CHARLES N. VOIGHT.

Witnesses:
 FREDERIC N. SCHNEIDER,
 GEORGE RUECKEL.